May 12, 1964 E. A. AVAKIAN ET AL 3,133,268
REVISABLE DATA STORAGE AND RAPID ANSWER BACK SYSTEM
Filed March 9, 1959 8 Sheets-Sheet 1

INVENTORS
E. A. AVAKIAN
R. J. BUEGLER
BY
John J. Logan
ATTORNEY

REVISABLE DATA STORAGE AND RAPID ANSWER BACK SYSTEM

Filed March 9, 1959 8 Sheets-Sheet 2

INVENTORS
E. A. AVAKIAN
R. J. BUEGLER
BY
John J. Rogan
ATTORNEY

REVISABLE DATA STORAGE AND RAPID ANSWER BACK SYSTEM

Filed March 9, 1959 8 Sheets-Sheet 3

INVENTORS
E. A. AVAKIAN
R. J. BUEGLER

BY

John J Logan
ATTORNEY

REVISABLE DATA STORAGE AND RAPID ANSWER BACK SYSTEM

Filed March 9, 1959 8 Sheets-Sheet 4

INVENTORS
E. A. AVAKIAN
R. J. BUEGLER
BY
John J. Rogan
ATTORNEY

INVENTORS
E. A. AVAKIAN
R. J. BUEGLER
BY
John J. Rogan
ATTORNEY

REVISABLE DATA STORAGE AND RAPID ANSWER BACK SYSTEM

Filed March 9, 1959

8 Sheets-Sheet 6

INVENTORS
E. A. AVAKIAN
R. J BUEGLER

BY

John J. Logan
ATTORNEY

May 12, 1964 E. A. AVAKIAN ETAL 3,133,268

REVISABLE DATA STORAGE AND RAPID ANSWER BACK SYSTEM

Filed March 9, 1959 8 Sheets-Sheet 7

INVENTORS
E. A. AVAKIAN
R. J. BUEGLER

BY

John J. Rogan
ATTORNEY

REVISABLE DATA STORAGE AND RAPID ANSWER BACK SYSTEM

Filed March 9, 1959 8 Sheets-Sheet 8

INVENTORS
E. A. AVAKIAN
R. J BUEGLER
BY
John J. Rogan
ATTORNEY

United States Patent Office 3,133,268

Patented May 12, 1964

3,133,268

REVISABLE DATA STORAGE AND RAPID ANSWER BACK SYSTEM

Emik A. Avakian, Crestwood, N.Y., and Robert J. Buegler, Stamford, Conn., assignors to The Teleregister Corporation, Stamford, Conn., a corporation of Delaware Filed Mar. 9, 1959, Ser. No. 798,005
26 Claims. (Cl. 340—152)

The present invention relates primarily to data storage systems and more particularly to a data storage and query system having multiplexed inputs and outputs and wherein the answer-back signals can be of the type to control either a printing device, such as a teletypewriter, and/or an audio signal device, such as a telephone receiver.

One of the objects of the present invention is to provide a data storage and query system wherein a plurality of queries or requests for the same and/or different parts or sections of the stored data can be handled simultaneously and/or in an overlapping relationship and wherein the replies to the queries are similarly made.

Another object of the present invention is to provide such a data storage and query system wherein the querying of the stored data is by a series of dial generated pulses. In this connection a further object of the invention is to provide a data storage and query system with the system responding to a predetermined number of digit representing dial pulses and means for automatically indicating an error condition when more than the predetermined number of digits are dialed.

Still another object of the invention is to provide a data storage and query system capable of providing for a large number of separate query inputs, such as up to a thousand, and a like number of associated outputs with a query over any one input being answered over its specifically associated output.

A feature of the invention in this respect is the ability of the system to handle the queries at a relatively high rate such as from thirty to one hundred or more per second with substantially no waiting time required for recess to the storage data.

Another feature of the invention resides in its adaptability to an installation where the terminals of the input and output circuits are remote from the data storage unit and are connected thereto over suitable electrical circuits.

Still another object of the invention is to provide a novel data storage and query system having the above outlined objects and features and employing a minimum amount of equipment at the centrally located data storage unit as well as at the remote terminals of the input and output circuits.

Still another object of the present invention is to provide a data storage system wherein audio replies are made in response to keyboard, dial, and/or keyset generated inquiry pulses. In this embodiment of the invention the audio replies are assembled from pre-recorded words and/or phrases in accordance with the stored information selected by the inquiry pulses.

Still another object of the invention is to provide a system of the above general type wherein messages can be independently assembled in response to analogue variations in the parameters of a process or system such as a ground to air control system or an industrial process either locally or remotely.

The above and further features and objects of the present invention will be more apparent in the following detailed description of the preferred and one modified embodiment of the invention wherein reference is made to the accompanying drawings, in the latter of which:

FIG. 1 is a block diagram of the preferred embodiment of the system comprising the present invention showing the arrangement of various components of the invention and indicating the cooperation therebetween;

FIGS. 2 and 3 comprise a block diagram of the elements of the query input logic circuit employed in the present invention;

Figure 1:
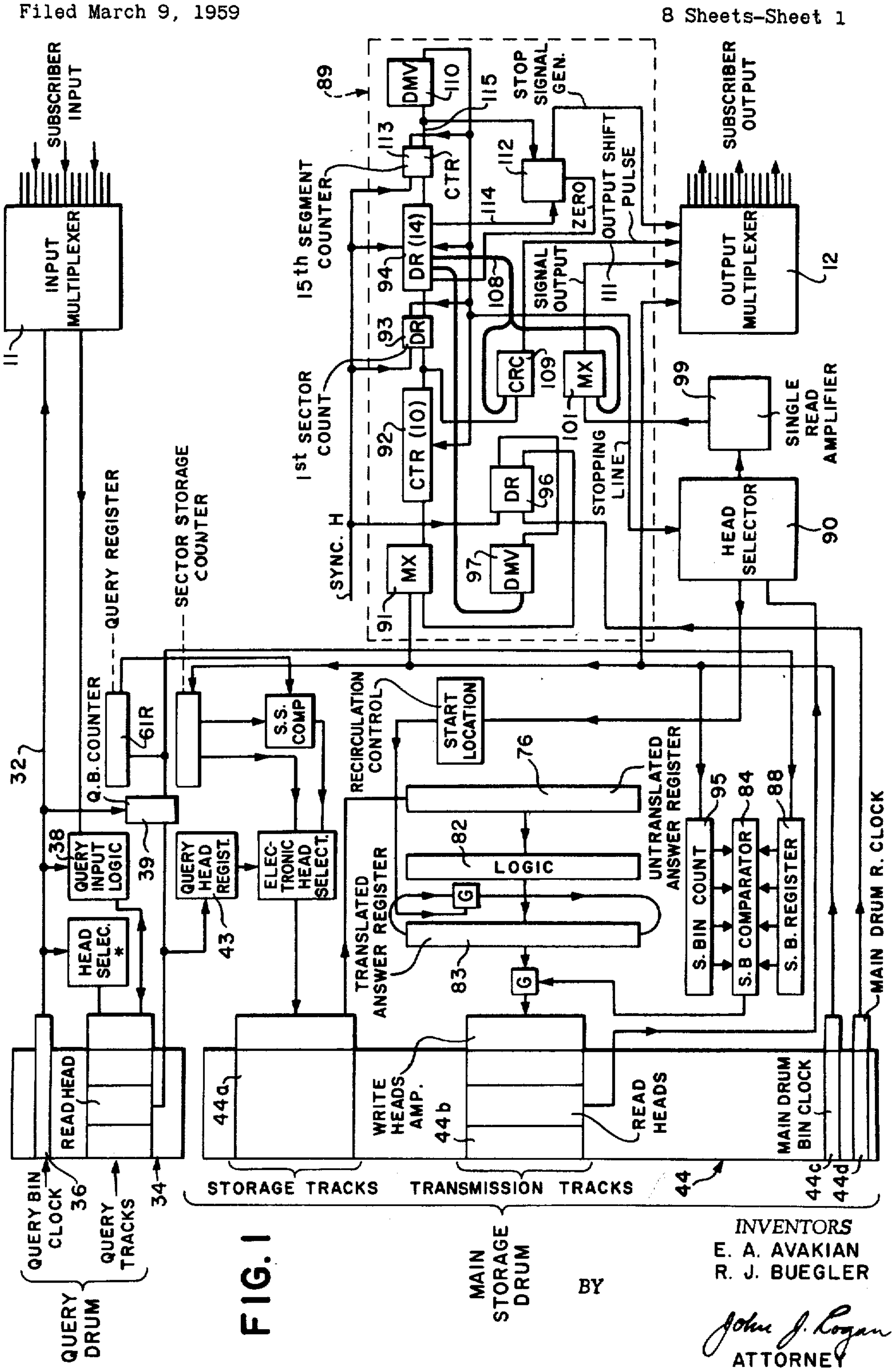

The principles of the present invention will be described for the purposes of illustration in the manner in which they may be applied to a Stock Quotation System, and it will be obvious that the invention is in no way limited to this particular application but may readily be applied to various types of inventory query systems such as, for example, a system wherein replies are assembled in response to analogue variations in the parameters of a process or system.

In the described application of the invention to a Stock Quotation System, a storage means, such as a magnetic drum which is referred to hereinafter as the main storage drum, is employed. The drum contains the up-to-date information, such as the current bid and asked price, price of last sale, etc. of the stocks selected for listing. In the preferred embodiment of the invention this information is stored in such a manner that it is adapted to control the generation of signals capable of operating the conventional type of start-stop telegraph recorder whereas in the modified embodiment the information is stored in such a manner as to control the audio reproduction of the desired information from selected pre-recorded words and phrases. As shown in the drawings, each subscriber to the Quotation Sytem in both embodiments is provided with a telephone type dial and when a subscriber desires information regarding a stock, he dials a plural digit number representing the particular stock. It will be obvious, however, that keysets can be employed equally well as the input device. At the central storage location the dial pulses are received and control the assembling of the information relating to the stock number dialed and transmitting of this information back to the subscriber requesting it. With the audio reply arrangement the information is assembled from pre-recorded words which the subscriber may hear through the receiver part of his telephone whereas when the replies are start-stop telegraph signals they are recorded by a teletypewriter at the subscriber's office. It is entirely within the concept of the present invention to provide a combination of an audio and teletypewriter system where the particular numbers dialed determine the type of reply obtained.

Each subscriber or query station may be connected to the central storage location by two pairs of circuit conductors, one pair of querying the storage and the second pair for receiving the reply, or by a single pair to conduct both the query and reply. However, as described herein, each subscriber has a single circuit input or query line and a single circuit answer, reply or output line with a common ground return. As hereinbefore pointed out, a main storage magnetic drum is employed to contain the up-to-date stock information, and associated with the main storage drum is a second magnetic drum which is called a query drum. The two drums are conventional type magnetic drums with the recirculating register type read-write heads and rotate at asynchronous speeds with respect to one another. The query drum has so-called subscriber's bins or slots for each subscriber, with each bin comprising a bit from predetermined number of tracks of the drum in an arrangement more fully described hereinafter. With a plurality of bins for each subscriber the rate of transmitting to a subscriber may be greater for a given speed of rotation of the drum than with a single bin per subscriber. In the following it will be assumed that the query drum provides for 1024 subscribers and accordingly has a like number of bins. The query drum also has tracks arranged to generate a clock pulse at the beginning of every 1024 count and a query bin clock pulse for every bin on the drum. Associated with the two drums are a number of control circuits and units, and in order to simplify the disclosure, these control circuits and units, many of which may be of conventional design, are referred to in terms indicative of the function or functions performed thereby. In addition, for the purpose of simplifying the disclosure, the drawings for the most part are diagrammatic or block diagrams with the various control circuits and units shown as interconnected elements. One of the features of the design of the circuits of the present invention is the arrangement whereby a large number of the units or parts thereof are of the plug-in variety which greatly facilitates the construction and servicing of the system. The details of the circuits of some of the units, however, are shown in separate figures where such is thought desirable or helpful for a complete understanding of the manner of operation of the unit.

Figures 5, 6:
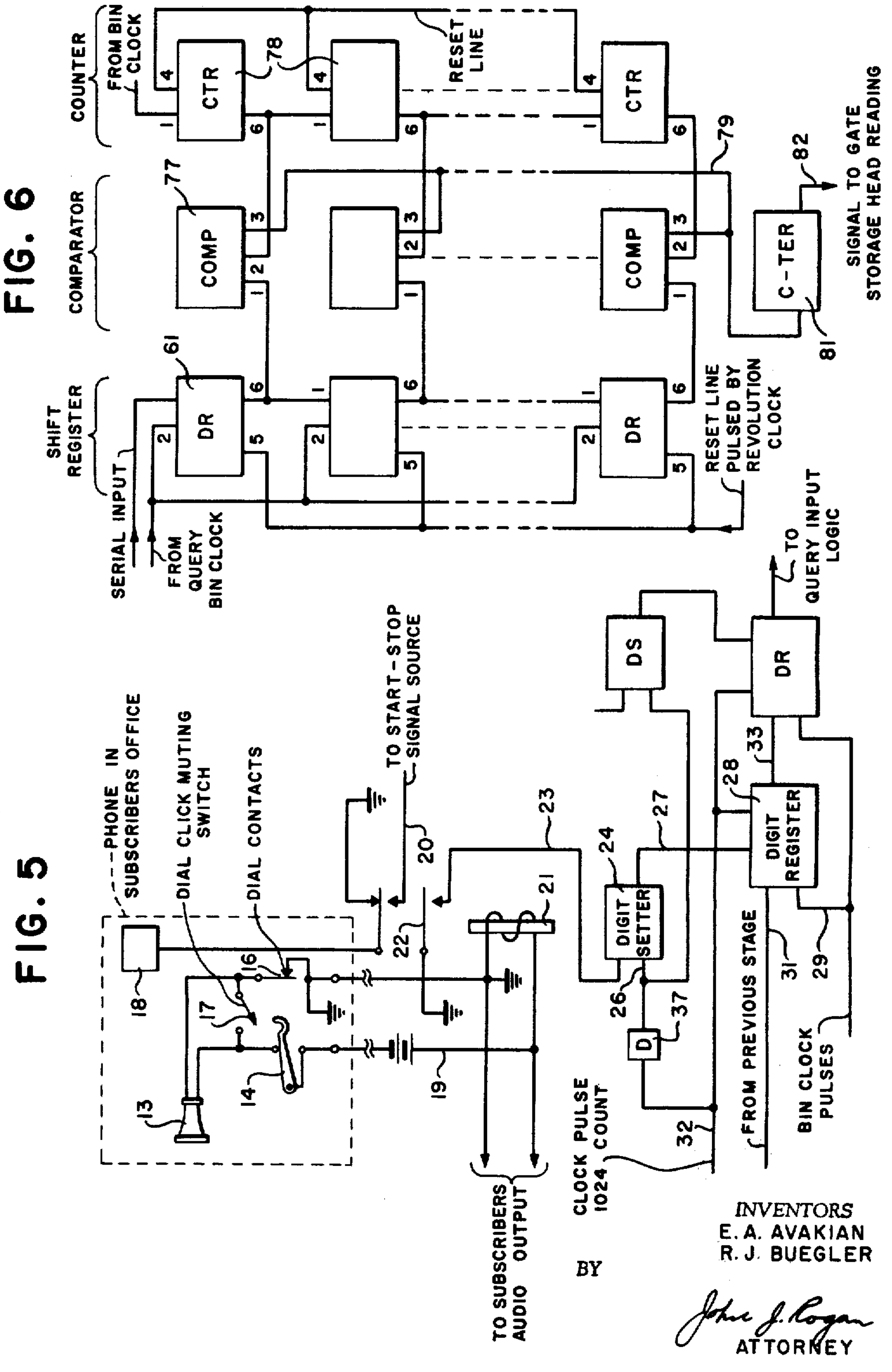
FIG. 5 is a showing of some of the elements of a subscriber's input circuit.
FIG. 6 is a block diagram of the comparing circuits.

The query or input lines from the subscribers terminate at the central location in a so-called input multiplexer indicated by reference numeral 11, FIG. 1, and the sending lines to the subscribers originate at a so-called output multiplexer 12. The details of sections or stages of the input multiplexer 11 are shown in FIG. 5 as well as the equipment at a subscriber's office. This equipment may include a conventional type telephone having a receiver 13, a hook switch 14, dial contacts 16, and a dial click muting switch 17 together with a start-stop type teletypewriter 18. When the associated dial is generating dial pulses by opening and closing the line circuit, the dial click muting contacts 17 are closed. The dial pulses are transmitted over the query line 19 to the central location where they operate a relay 21. When the reply to a query is to be received on the teletypewriter 18, a switch (not shown) on the dial mechanism switches the teletypewriter to ground while dialing, and after dialing the switch operates to break this ground. In an audio reply system, the reply would be received over the telephone receiver 13.

Figure 12:
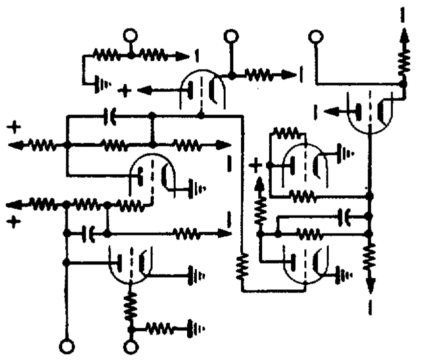

The relay 21 has a grounded tongue 22 with a make contact connected to the static line 23 of a digit setter 24. The digit setter 24 is an "and" gate and a plus pulse input on input lead 26 causes current to be drawn on output lead 27 if the static line 23 is high. The relay 21 when operated also completes a circuit between the teletypewriter 18 and a lead 20 over which start-stop teletypewriter signals are received. The digit setter may have a circuit such as shown in FIG. 12.

Figure 13:
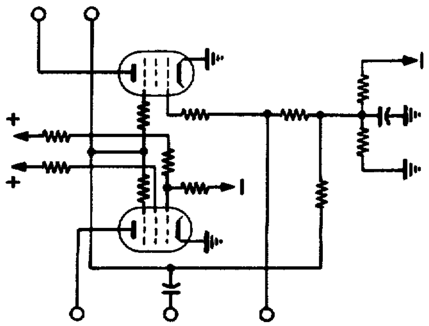

The relay 21 follows pulses generated by the dial contacts 16 and it in turn pulses the digit setter 24. The output line 27 of the digit setter 24 feeds into a digit register 28 which is essentially a flip-flop so arranged that a pulse on input lead 29 drives the flip-flop to a "one" or "zero" state depending on the voltage level on the static input lead 31. A pulse into the digit register on reset lead 32 resets the same and the output lead 33 forms the static input lead of the digit register of the next stage. The circuit details of a digit register such as 28 are shown in FIG. 13.

The digit registers, such as 28, one for each subscriber to the system, form a shift register which operates in the manner hereinafter set forth. In normal operation the query drum, FIG. 1, which has a query bin clock 36, sends a clock pulse over lead 32 to the shift register of the input multiplexer 11 at every 1024 count. The 1024 count corresponds to the possible number of subscribers and is chosen as a matter of convenience. As will appear, other counts could be employed if desired. The shift or clock pulse resets the digit registers 28 of the entire shift register, and after a delay caused by a delay circuit 37, the same clock pulse is applied over leads 26 to all the digit setters 24. The individual digit setters 24 in response to this pulse set respectively associated digit registers 28 in accordance with the state of its respective dial contacts at that particular time. The setting of the digit register 28 requires only a few microseconds, and since the bin clock is assumed to pulse at the rate of approximately 50,000 pulses per second, the digit registers are all set before the first bin clock pulse arrives.

There is a bin clock pulse for each subscriber's bin on the query drum, and as these pulses are applied to the shift register over leads 29, each stage of the register shifts its bits or conditions to the next adjacent stage or one stage to the right, as shown in FIG. 5. Thus the condition of all the subscriber dials registered at the time of the last 1024 count pulse is represented by a series of pulses obtained from the output of the last stage of the shift register. These pulses are applied to what is called a query input logic circuit 38, FIG. 1, which is shown in more detail in FIGS. 2 and 3. The rotative speed of the query drum and the number of sets of subscriber's bins thereon are such that for normal dial pulses of approximately ten per second, the condition of each subscriber's dial is sampled several times per change. Since the input multiplexer shift register may have as many stages as there are bins on the query drum, and since the bin clock causes the register to shift, there is complete synchronization between the query drum and the input multiplexer.

Figure 2:
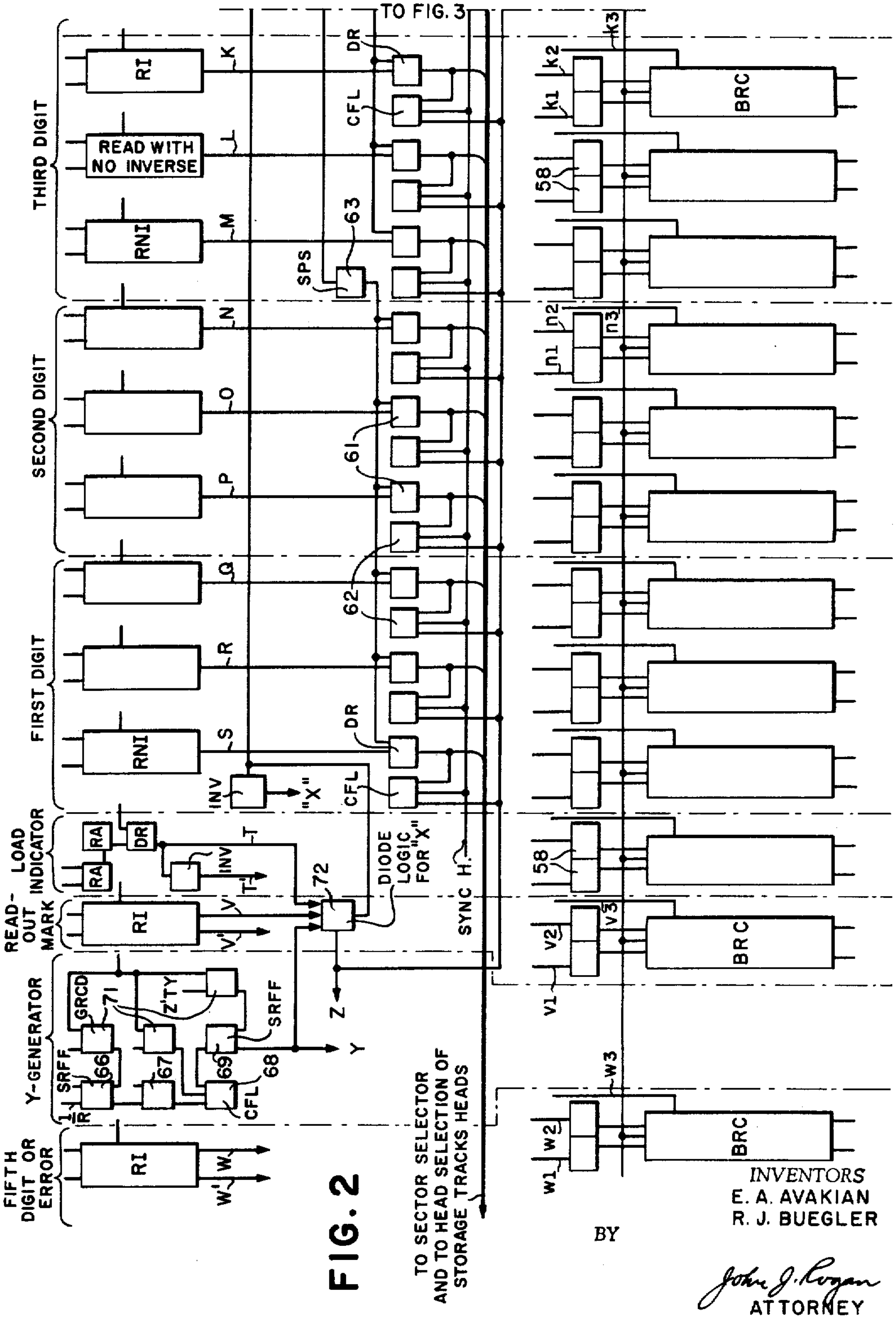
Figure 3:
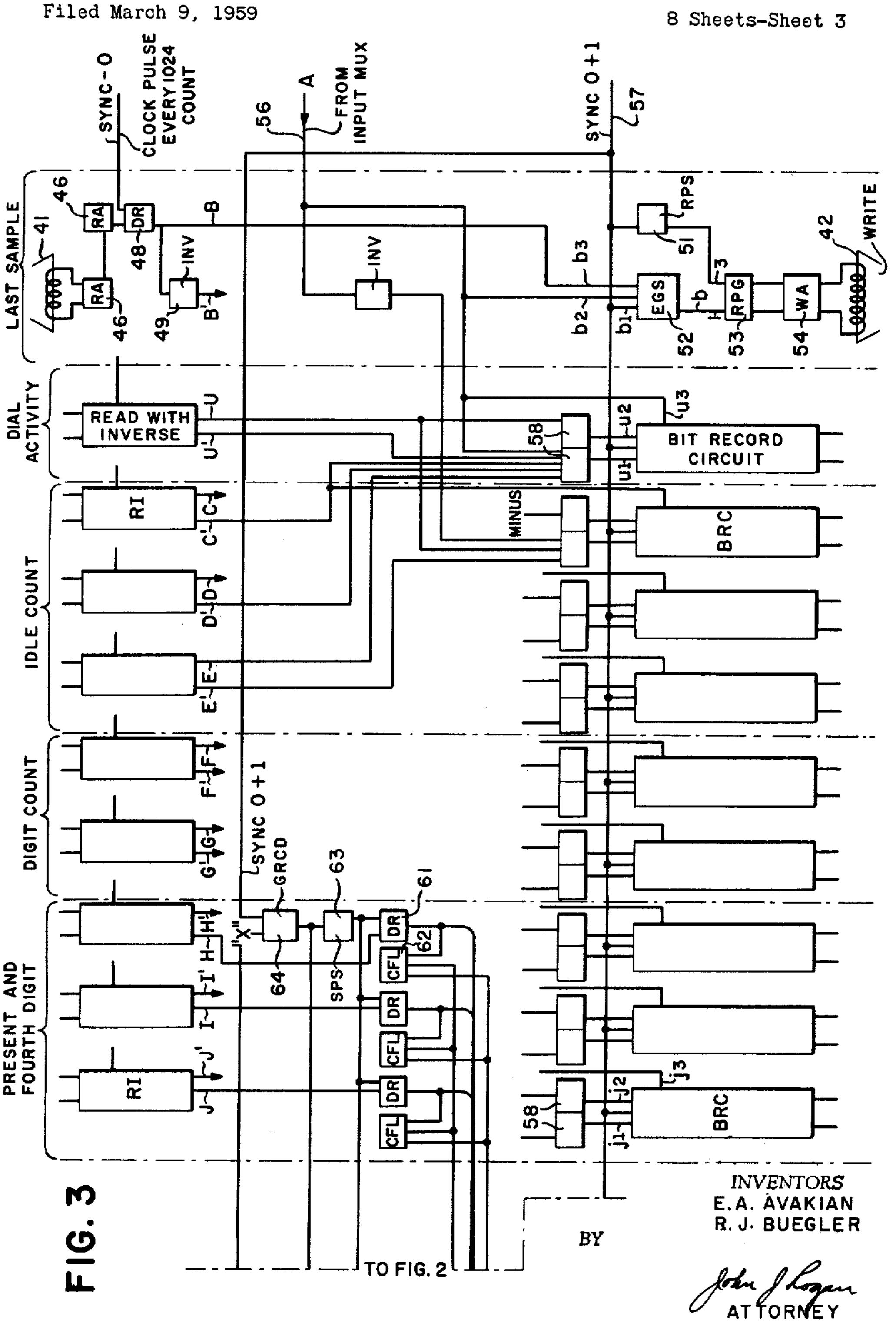

The query drum 34, as stated, has a plurality of tracks around the periphery thereof and read-write heads are associated and individual to each such track. In addition to the bin clock or count track, there are others identified by alphabetical characters. Each of the latter tracks or groups thereof are assigned functions as indicated in FIGS. 2 and 3, and their purpose will more fully be set forth hereinafter. On the assumption that there are 1024 subscribers to the system, a 10-bit counter 39, FIG. 1, operated from the query drum bin clock provides a synchronizing pulse at each 1024 count. With such an arrangement there will be 1024 bits in each track, but since the read heads 41 and the write heads 42 of the query drum are separated by a distance equivalent to at least 32 bits, and allowing for the two bits underneath the heads, the drum has an area of 31 bits along its circumference on which there are no recordings. In operation of the drum a bit is always rewritten one clock or pulse time after it has been sampled, and as the drum rotates, a given bit is always precessed around the drum periphery each time it is sampled and rewritten.

The query input logic circuit 38 is connected between the read and write heads and the bits detected by the read heads reside in circuit 38 for one clock pulse. The total number of clock pulses must take account of the 1024 bits of information and the 32 bits of blank space and one additional clock pulse for the input logic circuit during which any particular bit is in the logic circuit. This gives a total of 1055 clock pulses per revolution of the query drum or 1024 plus 32 minus 1.

In general terms the function of the query input logic circuit 38 is to take the serial output from the last stage of the shift register of the input multiplexer 11 and gather the outputs so that the sampled condition of each subscriber is registered in the subscriber bin of the query drum assigned or designated for that subscriber. The logic circuit 38 must further manipulate the bits of respective subscribers in such a manner that when a subscriber has completed a dialing operation, the particular subscriber's bin will have recorded therein the number dialed by that subscriber. The decimal digits dialed by each subscriber and received at the input multiplexer 11 are converted by the query input logic circuit 38 and the query drum 34 into binary digits. Following the operation of the logic circuit on the dial decimal digits, a register 43, called the query head register, is filled with binary digits which in turn in part determine the particular storage or segment of the inventory being requested. The main storage drum 44, FIG. 1, includes a section 44*a* having a plurality of storage tracks, a transmission section 44*b* having a plurality of transmission tracks, a main drum bin clock track 44*c* and a main drum read clock track 44*d*.

Referring now to FIGS. 2 and 3 showing the detailed arrangement of the elements of the query input logic 38, it will be noted that this circuit is divided into a number of vertical sections with each section having an assigned function as indicated, such as "last sample," "dial activity," "idle count," etc., and containing one or more reading heads 41 and one or more writing heads 42 with associated control units. The control units associated with the read head 41 of the first right hand section which is identified as the "last sample" or "B" section include a pair of read amplifiers 46, a digit register 48 and an inverter 49.

Figure 14:
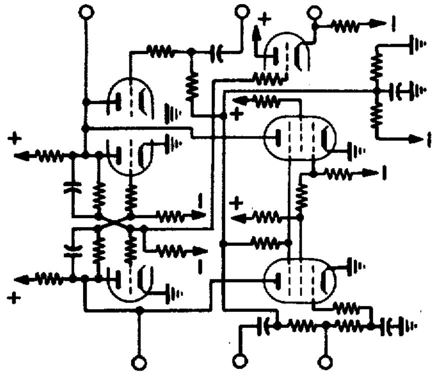

A group of such control units is herein termed a "read with inverse" or "RI" reading package. The digit registers 48 of these units are set by an input pulse on the sync-zero lead, and by use of the inverter 49, two outputs of the head are obtained, one the inverse of the other. These two outputs are identified, for purposes hereinafter apparent, one by a capital letter and the other by a prime of the capital letter. For example, the "last sample" or "B" read section has two outputs "B" and "B'" and the arrangement of the writing package is such that when a "1" is read by the head 41, the "B" output is positive and "B'" negative, and when a "0" is read, output "B" is negative and "B'" positive. As indicated in FIGS. 2 and 3, reading head units B, U, C, D, E, F, G, H, I, J, T, V and W, or those included in the "last sample," "dial activity," "idle count," "digit count," "present and fourth digit," "load indicator," "read-out mark" and "fifth digit or error" sections have inverse as well as direct outputs. The K, L, M, N, O, P, Q, R, S reading head units or those included in the "third digit," "second digit," "first digit" and "Y generator" sections have no inverter included in their control unit group. These latter units are termed "read with no inverse" or "RNI" reading packages and have but one output identified by its respective capital letter. Circuit details of the digit register 48 of the reading packages are shown in FIG. 14 and the other units are of well known and/or conventional design.

Figure 15:
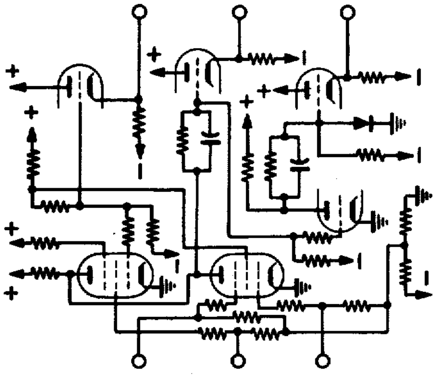
FIGS. 12 to 18 are circuit diagrams of various control or plug-in units employed in the system.
Figure 16:
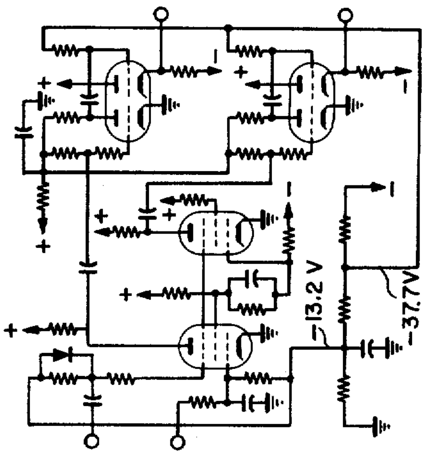

Each vertical functional section of FIGS. 2 and 3 has a "bit record circuit" or "BRC" writing package for each reading package and each writing package includes in addition to the write head 42 a record pulse shaper 51, an either gate static 52, a record polarity gate 53, and a write amplifier 54. Details of the circuits of units 52 and 53 and the interconnecting arrangement are shown and indicated in FIGS. 15 and 16, respectively.

The either gate static 52 of the "last sample" section has an input control lead $b1$ connected to the "sync, zero plus one" lead 57, a signal lead $b2$ connected to lead 56 or the "A" lead over which is received the serial output from the input multiplexer representing the subscribers' dial conditions, a signal lead $b3$ connected to the B output of the associated read package and an output lead $b$. The gate 52 functions to pass the signal on lead $b3$ to output lead $b$ when control lead $b1$ is positive and to pass the signal on lead $b2$ to the output lead when control lead $b1$ is negative. The three leads $b1$, $b2$ and $b3$ form the inputs to the "B" write package composed of units 51, 52, 53 and 54, and all of the other write packages or bit record circuits of the read-write assemblies have corresponding control, input and output leads.

The leads such as $b1$ going into the "bit record circuits" act as control leads and generally when such leads are positive, any signal being read by the respective read head of its read package will be recorded by the respective write head. If, however, such a control lead is minus the bit read will be changed according to the logic unit associated with an input lead such as $b2$. The state of such a control lead as $b2$ is determined by a second logic unit associated with that write circuit.

As shown in FIGS. 2 and 3, each of the inputs to all but the "last sample" write packages have a pair of logic units 58 for combining to inputs thereto. Also as shown in FIGS. 2 and 3, some of the read packages such as those of the "first digit," "second digit," "third digit," and "present and fourth digit" sections each have a digit register 61 and a cathode follower lockout 62 associated therewith together with shift pulse shapers 63 and a gate RC delay 64 connected as shown. The digit registers 61 form a shift register called a query register, indicated as 61R, FIG. 1.

The conditions which cause respective "1's" to be recorded in a particular track, using conventional Boolean notations are:

Last sample (B):
- $b3$=B
- $b2$=A
- $b1$=Minus

Dial activity (U):
- $u3$=A
- $u2$=U
- $u1$=AU'+C'D'E

Idle count:
- (C) $c3$=C'
  - $c2$=Minus
  - $c1$=A'UE'
- (D) $d3$=D'
  - $d2$=A'DU
  - $d1$=A'CU
- (E) $e3$=D'
  - $e2$=Minus
  - $e1$=A'CDU Digit count:
- (F) $f3$=F'
  - $f2$=FT'
  - $f1$=C'D'E
- (G) $g3$=G'
  - $g2$=GT'
  - $g1$=C'D'EF Present or 4th digit:
- (H) $h3$=H'U
  - $h2$=H
  - $h1$=A'B+AU'
- (I) $i3$=I'U
  - $i2$=I
  - $i1$=A'BH+AU'
- (J) $j3$=J'U
  - $j2$=J
  - $j1$=A'BHI+AU'

3rd digit:
- (K) $k3$=H
  - $k2$=K
  - $k1$=C'D'EF'G
- (L) $l3$=I
  - $l2$=L
  - $l1$=C'D'EF'G (M) $m3=J$
$m2=M$
$m1=C'D'EF'G$ 2nd digit:

(N) $n3=H$
$n2=N$
$n1=C'D'EFG'$ (O) $o3=I$
$o2=O$
$o1=C'D'EFG'$ (P) $p3=J$
$p2=P$
$p1=C'D'EFG'$

1st digit:

(Q) $q3=H$
$q2=Q$
$q1=C'D'EF'G'$ (R) $r3=I$
$r2=R$
$r1=C'D'EF'G'$ (S) $s3=J$
$s2=S$
$s1=C'D'EF'G'$

Load indicator:
$t3=C'D'E$
$t2=T$
$t1=C'D'EFG+X$

Readout mark sequencer (V):
$v3=X'T$
$v2=V$
$v1=X+Z'YT$

5th digit check (W):
$w3=T$
$w2=W$
$w1=AB'T+T'$

Readout level:
X $X=TZ(V+Y)$
Z $Z=$Query register unload level

*Dialing and Filling of Query Bin*

There is complete synchronism between the query drum bin clock and the input multiplexer, and the reading heads 41 are so positioned that they are just coming into registry with a particular subscriber's bin at the particular instant a pulse or no-pulse condition representing the condition of that subscriber's dial is received at the logic unit over lead A. Thus the condition of each subscriber's dial is sampled in turn once for each 1024 bin clock pulses.

Let it first be assumed that a particular subscriber's dial is inactive, resulting in minus sampling pulses which are recorded as "0's" in the "last sample" or B track on the query drum and that this condition has existed for some time so that this subscriber's bin is empty. It will be understood in the following that when reference is made to the various tracks on the query drum and the recordings therein, it is the particular "bit" or recording position in the track associated with the bin assigned to the particular subscriber under discussion that is indicated and not the complete track.

Now let it be assumed that the subscriber begins to dial and that at the next sampling of that subscriber the A lead is positive. This will result in a "1" being recorded by the write head 42 in the B track of that subscriber. Thus the B or "last sample" track registers the last sampled condition of the respective subscriber. The speed of rotation of the query drum is such, say 40 revolutions per second, relative to the rate of the dial pulses, say 10 pulses per second, that each change in the dial condition is sampled at least twice.

The first positive pulse or first sample resulting in a "1" being recorded in the B track will also result in a "1" being recorded under the U or "dial activity" track in the same subscriber's bin since in accordance with the above formulas the conditions under which a "1" is recorded in the "U" or dial activity track are fully satisfied. Thus as the B track registers the last sampled condition of a subscriber's dial, the U track registers that a digit is being dialed and for reasons hereinafter apparent, this "1" will remain in the U track a predetermined length of time after the particular digit being dialed has completed pulsing the subscriber's circuit.

The C, D and E tracks are employed to count the idle revolutions of the query drum or the number of revolutions in which there is no change in the particular subscriber's dial. With the drum rotating at the rate of 40 revolutions per second and the dial operating at the rate of 10 pulses per second, tracks C, D and E will have a binary count of 2 between each pulse. However, the dial pulsing rate can vary considerably in the preferred embodiment of the invention as described herein without causing misoperation. In accordance with the given formulas whereby respective "1's" are caused to be recorded in the C, D and E tracks, it can be assumed that when a binary count of 4 is reached in the C, D and E tracks, the subscriber's dial has reached the end of a given digit. Thus these three tracks C, D and E are referred to as the idle count tracks.

In the system herein described it is assumed that each request for a piece of information such as the details regarding a stock is made by the subscriber dialing a 4-digit number and that the digits are dialed in the usual manner with a pause but without extended periods of time between the digit dialing operations.

During the dialing of the first digit the formulas relating to recording in the "present or 4th digit" tracks H, I and J are satisfied and accordingly the first digit is registered in these tracks. After the dialing of the first digit and before the beginning of the dialing of the second digit, the idle count tracks will have reached a binary count of 4 and each time such an idle count is made, a count is placed in the "digit count" tracks F and G. The first count placed in the F and G tracks causes the digit registered in the H, I and J tracks to be shifted to the "first digit" tracks Q, R and S. This registered digit thus becomes the first digit of the final query. The above and further operations are all in accordance with the satisfying of the conditions set forth in the formulas with respect to the particular tracks.

Following the shifting of the first digit to tracks Q, R and S, the dial pulses representing the second digit are received and, as in the above, these are registered on tracks H, I and J. At the end of this digit the idle count begins again and when the idle count reaches 4, a second count is placed in the digit count tracks F and G. This shifts the contents of the H, I and J tracks to the "second digit" tracks N, O and P. Thus the second digit of the final query is registered. In a similar manner the third digit is first registered in tracks H, I and J and an idle count of 4 thereafter places a third count in the F and G tracks which transfers this digit to the "third digit" track K, L and M. Next the fourth and final digit is registered in the H, I and J tracks and on the completion of the idle count thereafter and the placing of the fourth count in the F and G tracks a mark is placed in the "load indicator" track T signifying a loaded query drum condition. Subsequently as hereinafter apparent the Z lead is positive and this indicates that the four digits registered in the four-digit track H to S can be unloaded into their respective digit registers 61 forming the query register 61R.

In addition to the above described tracks, the query drum also includes a "fifth digit or error track" W, a "Y-generator track" Y, and a "readout mark track" V. As will become more apparent hereinafter, the V track marks the order in which the individual subscriber's bins that are loaded should be dumped or transferred into the query register 61R. In other words, the V track serves as a sequencer since it determines the sequence of unloading the subscriber's bins.

The W track marks an error made by a subscriber dialing more than four digits. In such an event a particular code is automatically put into the query register 61R whereby the register seeks out a storage marked "error indication" in the storage tracks of the storage drum 44 which in turn causes the transmission to that particular subscriber of a message indicating the error condition. The message may be a phrase such as "dial again" and will be composed of either start-stop pulses or audible signals depending upon the type of system. In addition to the above error or fifth digit detecting arrangement a logic circuit is provided for detecting the dialing of numbers for which there is no stored information. This circuit operates from the digit reading heads H through S and when it detects such a number it prevents this number from registering in the query register and instead on each such occasion will put into the query register 61R a predetermined number which will cause the head selection circuits to select a storage whereby an appropriate message, such as "wrong number, dial again" is transmitted to the particular subscriber, again in either start-stop or audible signals. This specific logic circuit employed may include a series of diodes such as those shown in FIG. 8 arranged to detect the abnormal condition.

*Priority in Unloading Subscribers' Bins*

The subscribers' bins are filled in an entirely random or non-selective order and it is highly desirable that all subscribers be given equal access to the storage so that a particular subscriber with a loaded bin will not be kept waiting indefinitely while other subscribers whose bins are more favorably distributed on the query drum are served. The circuits for assuring equal access of all subscribers to the storage are diagrammatically indicated in the left hand section of FIG. 2 and involve a number of the query drum tracks. Whenever a query drum bin is loaded or a mark in the T track is read, and at the same time the query register 61R is not loaded, this condition is indicated by the Z lead being positive as well as key lead Y being positive. These conditions generate a level X causing the digits stored in the H to S tracks to be loaded into the query register. At this time the formula or equation $v1=X+Z'YT$ will be satisfied and the very next loaded bin that comes under the readings heads 41, which condition is indicated by a mark in its T track, will satisfy the formula or equation $v3=X'T$. Thus a 1 will be placed in the V track of the next loaded bin. Only one subscriber's bin at a time can have a 1 in the V track and the bin having this 1 will be the next one to be unloaded. The V track of a loaded bin is marked only when there is a positive level on the Y lead, and it is made positive whenever a bin is unloaded. With the above arrangement whenever a number of different bins become loaded during a single revolution of the query drum, the unloading of the bins is in such a manner as to precess the unloading operations around the drum in the direction of its rotation.

When power is first turned on the system such as at the beginning of the day, there obviously has not been a bin unloading operation and hence a Y signal can not be generated in the usual manner. Accordingly, provision for generating a Y under these conditions must be made.

As shown in FIG. 2, a set-reset-flip-flop 66 is arranged to generate an output once each 1024 count, and this output is applied through a gate RC delay 67 and a cathode follower lockout 68 to a second set-reset-flip-flop 69. The output of the second set-reset-flip-flop 69 is the Y output and such a Y output is generated during certain revolutions of the query drum such as the first one of the day. If, however, during that revolution of the query drum, when a Y would otherwise be generated, a V is produced, the positive level on the Y lead will be removed. The V condition is applied through gate RC delay 71 to the flip-flop 66 and if a Z'TY condition exists during such a revolution, this condition applied through another gate RC delay 72 also cuts off the Y output.

Figure 17:
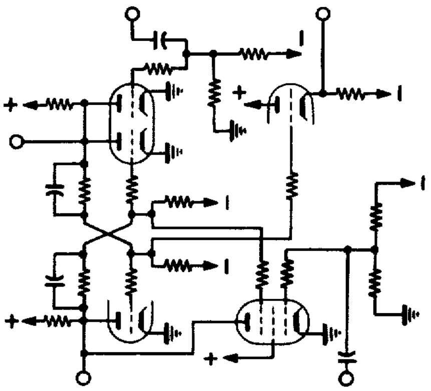

Neither a V nor a Z'TY exist at the beginning of the day, as there has been no bin unloaded to bring about a V. Likewise the Z is not primed as the query register will be in an unloaded condition. Accordingly, at the beginning of the day the first complete revolution of the query drum will generate a Y and after this first revolution a V can be put after the first loaded bin as there will be a Y. As soon as an X is generated, the Y is regenerated by circuitry including the logic unit 72. The Z lead assures that a bin will not be unloaded until a Z' is generated or that there is an empty query register. The circuit details of the unit 66 is shown in FIG. 17.

*Main Storage Drum Details*

In the embodiment of the invention disclosed herein the storage section 44a of the storage drum 44 or the part containing or upon which the information is stored, such as stock quotations or any other type of inventory information that a subscriber may request, is divided into sectors about the periphery thereof. Each sector contains a part of the storage tracks and in the embodiment disclosed there are 25 sectors and approximately 40 tracks with the part of a track in each sector containing 200 bits of information. Such an arrangement provides sufficient storage to accommodate the desired information relating to up to 1000 different stocks. It will be obvious, however, that the above arrangement of the storage tracks is only illustrative and that numerous other arrangements can readily be made to accommodate various conditions. The stored information can be put on the storage drum and kept up-to-date in the conventional manner, such as for example in accordance with the disclosure of U.S. Patents Nos. 2,800,642 and 2,594,960 of H. F. May.

When it is desired to read-out a piece of stored information, the read-out head for that track and the particular sector containing the information must be selected. The sector selection is performed by a query sector register made up of a number of the hereinbefore described digit registers 61 associated with the query drum heads H to S, and the proper read-out head is selected under control of other ones of the digit registers 61. When the proper head and sector selection is made, the selected information is read into the register 76, FIG. 1.

Figure 18:
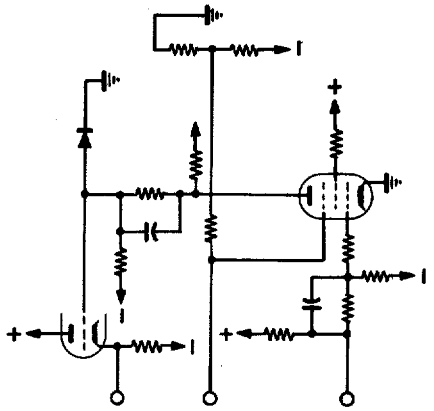

The sector selection is made by counting the various sectors as they pass under the read-out heads, and when the proper one is in registry with the heads a pulse is sent to the head selection circuits to cause read-out into register 76. The details of the counting arrangement are shown in FIG. 6 with a shift register composed of a number of digit registers 61 with individually associated comparator units 77 and counter units 78 forming a counter. A serial input is applied to the first or uppermost digit register which is caused to shift downward by the query bin clock pulses. After the digit registers are set, the counter starts counting as bin clock pulses are fed into the same. Subsequently all the comparator units 77 will register that the condition of each digit register 61 and its corresponding counter unit 78 coincide. This condition will cause non-conduction of current in the common lead 79 to the comparator terminator 81 and result in an output on lead 82 and thus indicate the similar states of the digit registers 61 and corresponding counters 78. The details of a comparator unit 77 and the comparator terminator 81 are shown in FIGS. 18 and 19, respectively.

*Translation and Expansion of Stored Signals to Teletypewriter Control Signals*

Figures 7, 8:
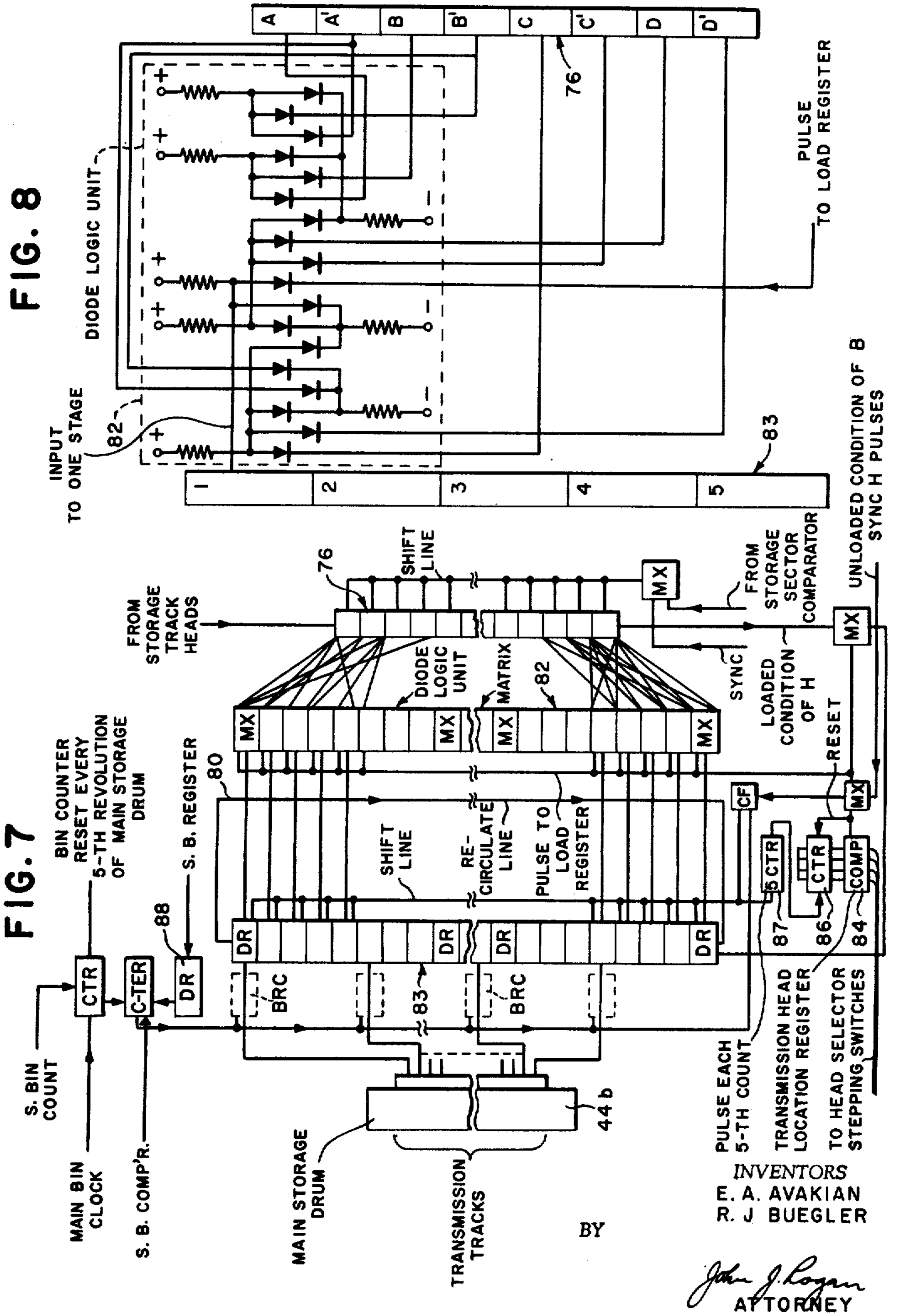
FIG. 7 is a block diagram of the translation registers employed as code expansion units.
FIG. 8 is a circuit diagram of a matrix employed in the system.

It is more efficient to store in the form of four bits or pulses per unit in the storage tracks of the storage section 44a of the main storage drum, and in order for these stored bits to operate the conventional type of teletypewriter, an expansion or translation of the stored bits to five bits per unit is necessary. Also, for proper operation of the system certain code groups, such as those controlling printer functions, must be injected into or added to the signals taken from the storage tracks and sent to the subscriber to control the teletypewriter thereat. The arrangement for accomplishing the expansion is illustrated in FIG. 7, and the following explanation refers to this figure and to FIG. 1.

The readout from the storage tracks 44*a* is dumped serially into the register 76, as pointed out above, and connected to the various stages of the register 76 is a logic unit 82 composed of a plurality of diode matrixes. One such matrix is shown in FIG. 8 and the output from each matrix forms the input to an associated stage of a so-called translated answer register 83.

The expanded translated answer register 83 is recirculated by lead 80 to bring the same into line with the reading head which is at that time transmitting to the output multiplexer 12. The comparator 84 samples the condition of a pair of stepping switches 85–E and 85–O arranged as in FIG. 9, which indicate which one of the heads of the transmission tracks 44*b* is being read at the moment.

The above-mentioned recirculation begins by units of 5 stages. Each time the 5 units are shifted there is a change in the counter 86, as every time counter 87 counts 5 shifts, the counter 87 pulses counter 86. The counting continues until the stages of counter 86 are similar to the leads from the stepping switches 85. When this occurs the message in register 83 is properly aligned with the reading head and therefore when the characters in register 83 are recorded on the transmission tracks, the subscriber requesting this message will have the message start at the next character transmission.

In the preferred embodiment of the invention a track of the query drum 34 has less than one-fifth the number of bits therein as there are in a track of the main storage drum 44, or the query drum is substantially one-fifth the diameter of the main drum. The part of the main storage drum 44 containing the transmission tracks 44*b* is divided into 5 segments and each subscriber is assigned a bin or slot in each one of these five segments. The order of assignment of the subscribers' bins is the same in each segment and corresponds to the order of assignment of the bins in the query drum. By this arrangement a subscriber's bin in any segment on the main drum can be located by noting the count position on the query drum of a particular subscriber and counting the slots on a segment of the main drum until the counts correspond.

The subscriber bin register 88, FIG. 1, controls the recording of a message in the correct subscriber bins of the sectors of the transmission track 44*b*. Register 88 is loaded by the query drum 34. This loading occurs when the query register 61R is loaded by loading the query subscriber bin counter 39 into the subscriber bin register 88. The main drum bin count 95 from track 44*c* is then compared with the subscriber bin register and when these counts coincide, one of the five bits of each character is recorded. Each time this occurs the register 83 is shifted one stage so that when the next bin count again coincides, the next bit of each character can be recorded. Such comparing and recording continues for the five bits of all the characters.

*Construction of Teletypewriter Control Signals*

The conventional teletypewriter operates under the control of code groups of five intelligence pulses with each such group preceded by a start pulse and terminated by a rest pulse. As pointed out above, the characters from which a message to a subscriber is assembled, are stored in only the five intelligence pulses and the rest and start pulses must be injected into the code groups for proper operation of the subscriber's teletypewriter. The circuits whereby this is accomplished are included in the dotted rectangle 89, FIG. 1, and the operation thereof will now be described. Reference at this point is also made to FIG. 10 which shows some of the details of the main storage drum layout which includes five segments with each segment containing 1024 bits in each transmission track thereof. As in the usual arrangement, the revolution clock track 44*d* has a single bit and the bin clock track 44*c* has a total of 5120 bits or 1024 bits for each segment.

Pulses from the bin clock 44*c* track are fed through a matrix gate 91 to a ten-stage counter 92 which produces an output pulse for each 1024 pulse input. The output of counter 92 is fed through a digit register 93 to a 14-stage register 94 which operates as a ring counter and sequentially pulses its 14 output leads once for each 14 input pulses.

The revolution clock track 44*d* assures synchronization in the circuits and a digit register 96 which is being set and reset and in turn allows the bin count to go through the gate 91. Digit register 96 is also pulsed through a delay multivibrator 97 by count pulses 5, 10 and 15 from ring counter 94.

Figure 10:
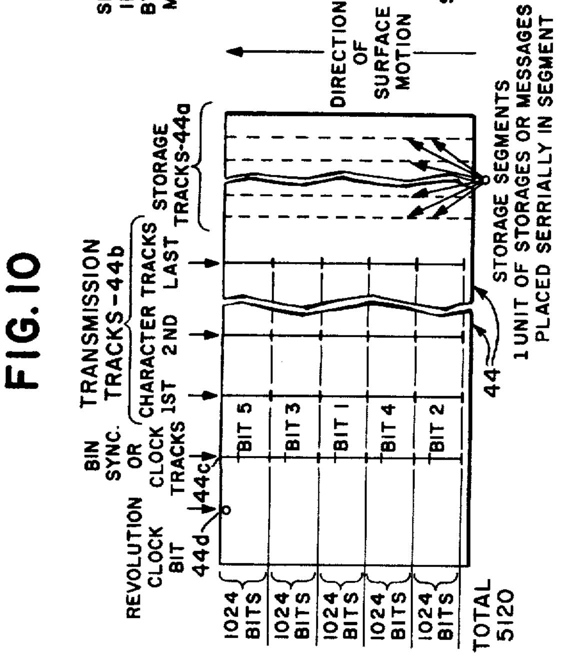
FIG. 10 is a layout of the main storage drum.

As shown in FIG. 10, the five segments of the transmission tracks do not occupy the entire drum surface and there is a small empty area from the end of the fifth segment to the start of the first. This gives the gate 91 time to be shut off and turned on again by the revolution clock. Also, as will be noted in FIG. 1, sync H pulses, which are from the basic clock of the system, are applied to the digit registers 93 and 96 and the counter 94.

Figure 11:
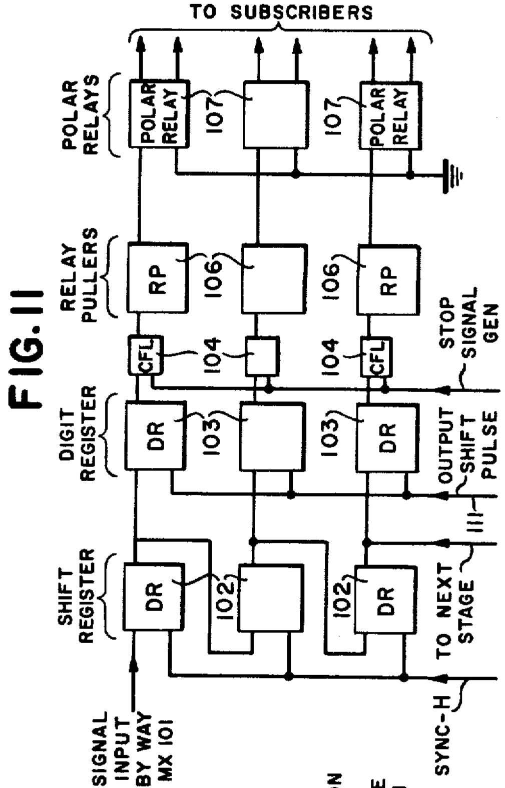
FIG. 11 is a block diagram of certain components of the output multiplexer.
Figure 9:
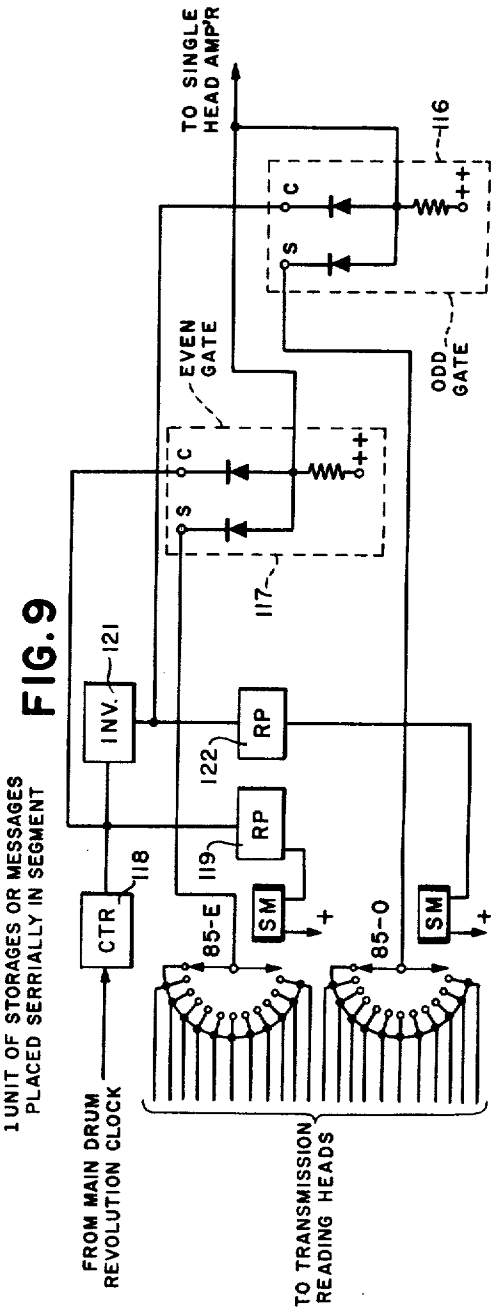
FIG. 9 is a circuit diagram of the controls of a pair of stepping switches.

One of the read-out heads associated with the transmission tracks 44*b* will be selected at a time by the rotary switches 85 of FIG. 9 included in the head selector 90, FIG. 1, and the signals picked up by the selected head and amplified by the single read amplifier 99 are gated by the matrix gate 101 before going to the output multiplexer 12. The gate 101 permits, as will be apparent hereinafter, the signals from the segments of the track with which the selected head is associated to go in a predetermined order to the output multiplexer 12. The output multiplexer includes, as shown in FIG. 11, a plurality of digit registers 102 forming a shift register to which the signal output from the selected read-out head, as gated by the gate 101, is applied and to which the sync H pulse is also applied. The individual outputs of the digit register 102 are applied to associated digit registers 103 to which over lead 111 the output shift or set pulse is also applied. The outputs of the digit registers 103 are applied through individually associated cathode follower lockouts 104 to respective relay pullers 106 controlling respective polar relays 107. The cathode follower lockouts 104 also have stop signal generator pulses applied thereto.

Each character track on the transmission track section is read by its respective head for three consecutive revolutions of the main drum in order that the five bits of a character, distributed in the five segments of the track, be properly transmitted to a subscriber. The method in which the segments are selected will now be set forth and it will be assumed that the first character track of the transmission tracks is being read and that the 10-stage counter 92 and the 14-stage ring counter 94 have both been set to "0." At the start of this revolution a pulse from the main drum revolution clock sets the digit register 96, which allows the bin counts to go through gate 91 and be gated into the counter 92. As will be more apparent hereinafter, the period in which the first segment is being read corresponds to or would normally occur during the last third of the stop pulse or bit of the last character sent to the particular subscriber when a seven and a half unit code is employed. Similarly, while the second and third segments are being read, the start bit or pulse for the character to be transmitted is generated, as will be pointed out.

At the end of reading the 1024 bits of the first segment, the counter 92 pulses the counter 94 resulting in a potential being applied to its number "1" lead and at the end of reading the second segment and during the reading of the third segment the number "2" lead from the ring counter 94 has a potential applied thereto. This lead, identified by reference numeral 108, FIG. 1, is the control lead for gate 101 and via this lead the gate is opened during reading of the third segment of the storage drum. Accordingly, the first bit of the character being received by all subscribers receiving a message is put into the digit register 102 of the output multiplexer 12. The potential of lead 108 is also applied to the delay gate 109 and its output pulse occurring at the beginning of the reading of the fourth segment, applied over the output shift pulse lead 111 to the digit register 103, causes the information in the stages thereof to be shifted parallelly to the relay pullers 106. This shifting of all the bits across from the shift register to the relay pullers occurs in an interval of micro-seconds.

During the reading of the fourth segment of the drum the number "3" lead from the counter has potential applied thereto and it, through suitable and conventional circuitry, causes the relay pullers 106 to operate the relays 107 in accordance with the setting of corresponding digit registers 103 and thus transmit the message bits to the subscribers. This first intelligence bit is transmitted to the subscribers while the fourth and fifth segments are being read.

While the fifth segment of the main drum is being read, lead 108 again has potential applied to it and again opens the gate 101 which permits the second message bit to be put into the shift register 102 in the same manner as the first bit was put into the register during the reading of the third segment. At the end of reading the fifth segment or while reading the first segment of the second revolution, the delay gate 109 applies another pulse over lead 111 to the register to cause it to shift the second bit information stored therein parallelly to the digit registers 103. Subsequently this information is transferred to the relay pullers 106 for operating the polar relays 107 accordingly to transmit the second bit to the subscribers. This second intelligence bit of the message is transmitted to the subscriber during the reading of the first and second segments of the second revolution of the drum.

Similarly the gate 91 is again controlled by the digit register 96 to permit the third message bit to be put through the described circuitry into the register 102 during the reading of the second segment of the second revolution and subsequently transmitted to the subscribers during the second revolution reading of the third and fourth segments. Likewise the fourth and fifth message bits are put into the register 102 during the second revolution reading of the fourth segment and the third reading of the first segment and are transmitted to the subscribers during the second revolution reading of the fifth and the third revolution reading of the first segments, and the third revolution reading of the second and third segments respectively. Thus the time consumed to transmit to the subscribers the last third of the stop pulse of the previous character and the five teletypewriter controlling intelligence pulses corresponds to two and three-fifths revolutions of the main drum.

The five intelligence pulses are followed by a stop signal and the first two-thirds of it are generated during the third revolution reading of the fourth and fifth segments, with the last third being generated during the reading of the first segment for the next character. The circuitry for generating the stop pulse includes a counter 113 which is pulsed by a number "14" lead of the counter 94 during the third reading of the fifth segment of the main drum. The counter 113 has an output lead 115 which is pulsed at the count of 15 or at the end of the third revolution. This pulse is applied to a delay multivibrator 110 to generate a reset signal which resets the counters 92 and 94 and restores the circuits for reception of the next character in conjunction with another cycle of operation as outlined above. The reset signal is also sent to the head selector 90. Output lead 115 is also applied to a cathode follower lockout 112 which also has an input lead 114 and an output lead called the "stop signal generator" to the output multiplexer 12.

Some of the details of the head selector 90 are shown in FIG. 9 and include the odd and even multi-level stepping switches 85–O and 85–E respectively. One level of each switch is used to sequentially connect one of the reading heads at a time of the transmission tracks to the single read head amplifier 99. The output of this amplifier serves, in the manner described, as the input to the shift register 102 in the output multiplexer. Other levels (not shown) of the stepping switches are arranged in a well known manner to indicate by a binary code the particular head that is reading. An odd gate 116, FIG. 9, and an even gate 117 alternately gate the wiper levels shown of the stepping switches to the amplifier 99. Clock pulses from the main drum revolution clock **44*d* are fed to a counter 118 which operates as a 3-bit scaler and for every third revolution the output controls a relay puller 119 which in turn operates the step magnet SM of the even switch 85–E. The counter output is also fed to an inverter 121 which controls through relay puller 122 the step magnet SM of the odd switch 85–O. The inverter 121 also gates the odd gate 116 and the output of counter 118 also controls the even gate 117**.

The operation of counter 118, gates 116 and 117 and switches 85 are such that during even numbered revolutions of the drum the even gate is open and the A level wiper of the even switch is connected to the amplifier 99, and during this interval the odd switch is stepped. Then the A level wiper of the odd switch is connected to the amplifier for the following odd numbered revolution of the drum, and during this revolution the even switch is stepped. The stepping switches 85 are of the spring driven type which step when the magnets are deenergized.

*Time Out Condition*

If desired, the query drum 34 may have eight additional tracks which would function in the same manner as the idle count track C, D and E which has a maximum count of eight. With the eight additional tracks a count of 256 would be possible. Accordingly any period between dialed digits lasting for more than 256 revolutions would result in the maximum count of 256 being reached. When this maximum count is reached, bits would be put into the T track and the W track for that subscriber. This will act as a fifth digit dialing and cause a "dial again" or like signal to be sent to this particular subscriber.

*Audio System Operation*

In a modification of the present invention an audible answer to a keyset or dialed query is obtained, setting forth, for example, the "bid," "asked," "last sale" etc. details of the particular stock queried. In this case the answer is assembled from a series or set of prerecorded words or phases that are combined under the control of a storage drum containing the up-to-date stock information.

Figure 4:
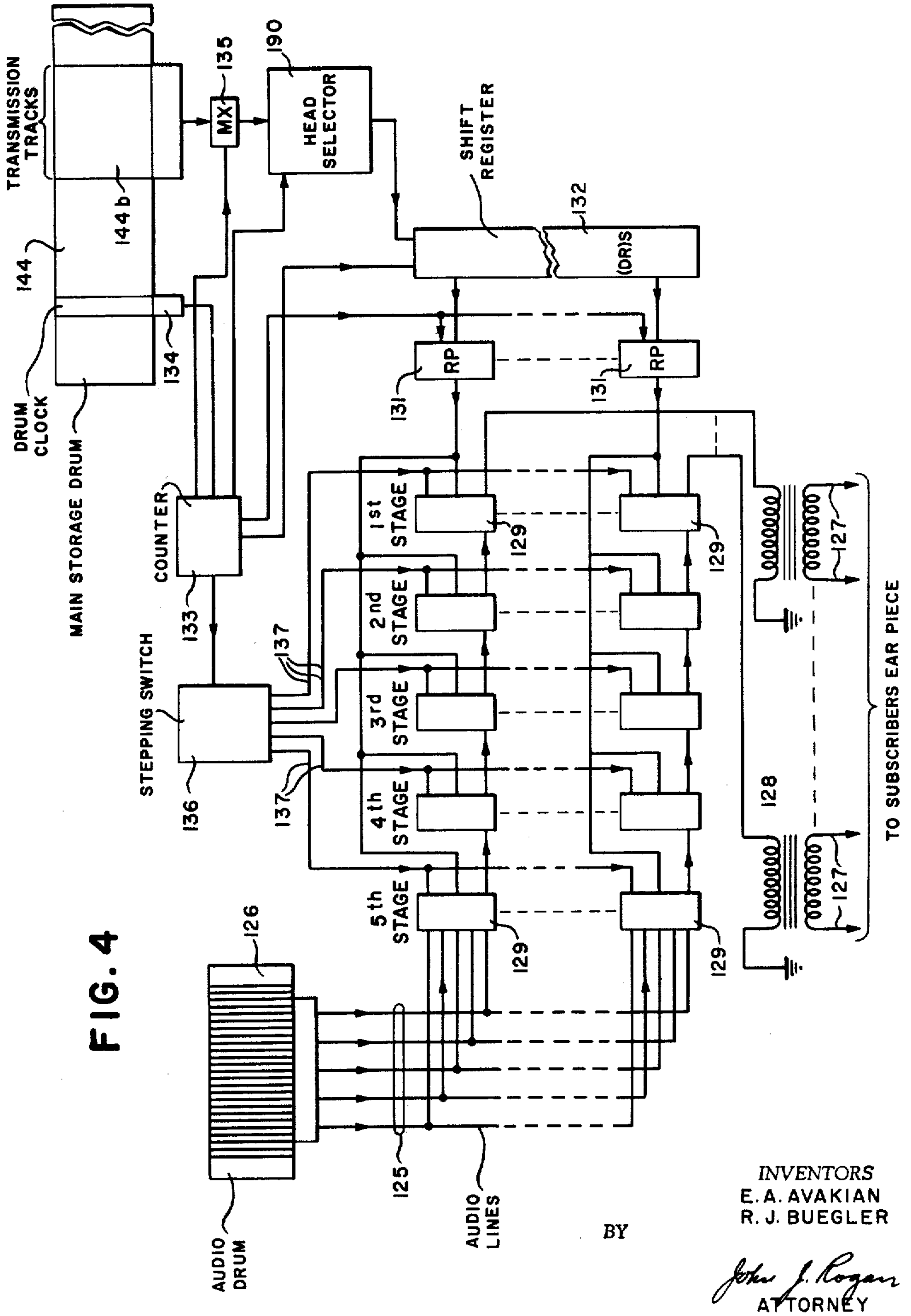
FIG. 4 is a diagrammatic showing of some of the components of the modified embodiments of the invention wherein audio outputs are assembled in response to query inputs.

FIG. 4 diagrammatically shows some of the elements and circuits of the audio arrangement, and some of the units thereof, as will appear, are similar and function in the same manner as those employed and described in the preferred embodiment of the invention. In the audio system a so-called audio drum 126 is employed having a number of selectable tracks, say 32, with each track having magnetically or suitably recorded thereon a single word. Each word on the tracks begin at a common axial line on the drum and each track has its respective readout head. Obviously, other types of recording could be employed, such as photoelectric with photocell scanning, as well as various types of storage means such as discs.

The separate outputs from the readout heads of the audio drum are called audio lines 125 and the lines to the various querying subscribers are arranged to be selectively and successively connected to one audio line at a time in such a sequence that each querying subscriber receives a message represented by the particular number dialed. Thus, the message that is sent to a particular subscriber is assembled from the separate words recorded in individual word tracks on the audio drum.

As shown in FIG. 4, each subscriber's answer line pair 127 is coupled through an individual transformer 128 and a set of well known type 5-stage transfer relay tree arrangements 129 to all the audio lines 125. The operation of the relays of the five stages determines the particular audio line connected at any one time to a subscriber. Associated with each relay tree 129 is a relay puller 131 having a thyratron locking circuit which in turn is associated with a specific stage of shift register 132 of conventional design.

The audio system of FIG. 4 employs a main storage drum 144 with transmission tracks 144*b* and an associated head selector 190, and these units are similar to and operate to find a specific storage to load in a particular subscriber's transmission bin in response to a dial query in the same manner as the drum 44, transmission tracks 44*b* and head selector 90, respectively, of the previously described teletypewriter signal system. The storage drum 144 rotates several times faster than the audio drum 126 and each of the transmission tracks 144*b* has five bits for a particular subscriber evenly distributed around the periphery of the drum. The head selector 190 through a gate 135 connects one of the transmission track reading heads at a time to the shift register 132. Let it be assumed that a reading head is reading the first fifth of a track for the first time, and as it does this the serial output therefrom is put into the shift register 132. At the completion of this fifth of a revolution the counter 133 operated by the drum clock track 134 pulses the shift register and causes the settings of the individual digit registers or stages thereof to be shifted parallelly to the relay pullers 131. Thus the relay pullers 131 are brought into action in accordance with the bits just read by the particular reading head connected at this time to the shift register 132.

A stepping switch 136 is also operated by the counter 133 and it applies a ground over one of the five conductors 137 at a time to all the relays 129 of a particular stage. For the assumed condition the ground from the stepping switch will be applied to all the relays in the first stage at the time the relay pullers 131 are first operated, and accordingly these relays of the first stage will be operated in accordance with the operation of the relay pullers. The counter 133 also controls the gate 135 in such a manner that a selected reading head reads successive fifths of a track every other revolution of the main storage drum 144. Thus to read all of a given transmission track requires ten revolutions of the drum. As the second fifth of a selected track is read and this output put into the shift register 132, the relay pullers 131 are again operated accordingly and at this time the relays 129 of the second stages are grounded by the stepping switch 136. Thus the relays of the second stage will be operated in accordance with the bits on the second fifth of the selected track. In a like manner the relays 129 of the third, fourth and fifth stages are operated in accordance with the bits of the third, fourth, and fifth fifths respectively of the selected transmission tracks. Thus after ten revolutions of the drum 144 each subscriber receiving a message will be connected through the five states of its respective relay tree 129 to a selected one of the audio lines 125. Soon thereafter the readout heads of the audio drum 126 will start reading the words in the tracks thereof and one or another of these words will be transmitted to each subscriber that is receiving a reply. The word transmitted to a particular subscriber may be the first, last, or any other word of the answer depending upon what part of a particular message it represents.

The thyratrons in the locking circuits associated with the relay pullers 131 are extinguished momentarily by well known circuitry before every parallel shift from the shift register. Also, each of the relays 129 has a conventional type holding circuit to hold the selected ones operated when their operating circuits are interrupted. After a word has been transmitted to the subscribers, the relay holding circuits are interrupted to reset the relays to normal.

The main storage drum 144 and the audio drum 126 may rotate at different speeds and the former may, for example, rotate at 30 r.p.s. and the latter at a slower speed of, say, 1.5 r.p.s.. Thus the audio drum would make one revolution in 0.66 second and the words recorded thereon would preferably be approximately or slightly less than 0.3 second long or require approximately one-half revolution of the drum to be read. Furthermore, the phase relationship between the two drums is such that just after the main drum has completed its ten revolutions and the various subscribers are connected to the selected audio lines, the reading heads of the audio lines are at the starting point for all the words recorded thereon. With the above speed relationship the transmission time of a word to the subscriber is equal to that required for the main drum to make ten revolutions and for these next ten revolutions of the main drum there is no transmission from the main drum. This stopped transmission time is effected by the gate 135 as controlled by the counter 133, and during this time the head selector 190 may operate to select another transmission track head. Thus the time required for one word selection and transmission is twenty revolutions of the main drum or 6.67 second.

While the audio drum 126 is completing the latter half of its revolution or during the third ten revolutions of the main drum, the five stages of the relay trees 129 are reset to again connect the audio lines to the subscriber in accordance with the second words to be transmitted in the same manner as set forth above, and these selections and transmissions continue as long as there are messages for the subscribers. Obviously, the messages to all the subscribers need not start at the same time as the time of starting and stopping the transmission of a message to a subscriber is governed by the condition of the subscriber's storage bin, and as in the preferred embodiment the condition of one subscriber's bin is independent of the condition of the others.

In the above description of the invention, both in its preferred and modified forms, the inputs to the system were from dial operated means at the subscribers' stations. However, if desired, the input could equally well be generated by well known types of keysets. In such cases a stepping switch could be employed to cause the query signals to be serially transmitted to the central equipment with the central equipment also starting the stepping switch. Thus all queries would be synchronized to start transmission at a given period.

From the above explanatory description of the preferred and modified embodiment of the present invention, it will be evident that the present invention provides a novel and improved query storage system that is extremely fast and flexible in operation; that requires a minimum of common equipment at the central storage location and also for each subscriber both at the central station and at the subscriber's station; that can be easily and readily adapted to serve a different number of subscribers up to a predetermined number and wherein the waiting or delay time for any one subscriber to receive a reply to its query is a minimum. It will also be evident that the present invention is in no manner limited to stock quotation data storage systems but may readily be applied to other inventory query systems, and it is desired that only such limitations be placed on the present invention as are imposed by the appended claims.

What is claimed is:

1. In an electrical storage and query system, a central storage station, a plurality of remote calling stations, individual paths for signal transmission in both directions between each of said calling stations and said central station, means at said calling stations for transmitting a succession of query signal pulses over respective paths to said central station, means at said central station to successively sample all of said incoming paths at least once for each query pulse and register the received pulses in storages assigned to respective calling stations, means controlled by such registrations in said respective storages for assembling answer-back signals representative of the query signals and means for transmitting from said central station over the outgoing paths the answer-back signal to respective calling stations.

2. In an electrical storage and query system, a central storage station, a plurality of remote calling stations, individual paths for signal transmission in both directions between each of said calling stations and said central station, means at said calling stations for transmitting a succession of query signal pulses over respective paths to said central station, means at said central station to successively sample all of said incoming paths at least once for each query pulse and register the received pulses in storages assigned to respective calling stations, means controlled by such registrations in said respective storages for assembling answer-back signals representative of the query signals and means for transmitting from said central station over said outgoing paths individual signal pulses of said answer-back signals in a time division arrangement whereby transmission of the answer-back signals to a plurality of respective calling stations occurs simultaneously.

3. The combination as set forth in claim 2, and wherein a complete answer-back is composed of a plurality of permuted groups of pulses.

4. In an electrical storage and query system, a central storage station, a plurality of remote calling stations, individual paths for signal transmission in both directions between each of said calling stations and said central station, means at said calling stations for transmitting a succession of query signal pulses over respective paths to said central station, an individual pulse storage at said central station assigned to each of said calling stations for storing queries therefrom, means operative on a time division basis for simultaneously loading said storages in accordance with successions of query representing signal pulses transmitted from respective calling stations, indicating means for indicating the storage of a complete query in a storage, an information storage at said central station, means controlled by said indicating means and the stored query for assembling from said information storage an answer-back signal represented by the stored query, said answer-back signal being composed of a series of pulses and means for transmitting said answer-back pulses to respective calling stations on a time division basis whereby a plurality of answer-backs can be transmitted simultaneously.

5. In an electrical data and query storage system, a central data storage station and a plurality of remote query originating stations, individual signal transmission paths between said remote stations and said central station, a magnetic information storage device, a magnetic query storage device and an input multiplexer at said central station, said query storage device having a bit storage bin for each one of said remote stations, means at said remote stations for transmitting queries comprising a series of electrical pulses to said central station, means including said multiplexer for converting received electrical query pulses to bits for storage in respective remote station storage bins on said query storage device, means controlled by said stored bits to select a representative item of information in said information storage device, an output multiplexer, and means including said output multiplexer to transmit electrical signals representative of the selected item to the calling station requesting the same.

6. In an electrical data and query storage system, a central data storage station and a plurality of remote query originating stations, individual signal transmission paths between said remote stations and said central station, a magnetic information storage device, a magnetic query storage device and an input multiplexer at said central station, said query storage device having a bit storage bin for each one of said remote stations, means at said remote stations for transmitting queries comprising a series of electrical pulses to said central station, means including said multiplexer for converting received electrical query pulses to bits for storage in respective remote station storage bins on said query storage device, means controlled by said stored bits to select a representative item of information in said information storage device, an output multiplexer, means including said output multiplexer to transmit electrical signals representative of the selected item to the calling station requesting the same, and means including said input and output multiplexers to enable said system to receive a plurality of individual queries and make replies thereto simultaneously.

7. In an electrical data and query storage system, a central data storage station and a plurality of remote query originating stations, individual signal transmission paths between said remote stations and said central station, a magnetic information storage unit, a magnetic query storage unit and an input multiplexer at said central station, said querry storage unit having a bit storage bin for each one of said remote stations, means at said remote stations for transmitting queries comprising a series of electrical pulses to said central station, means including said multiplexer for converting received electrical query pulses to bits and storing the same in respective remote station storage bins on said query storage unit, means to collect query bits of each transmitting remote station and assemble the same to select representative items of information in said information storage unit and including means to process such stored bits in said query storage unit.

8. In an electrical data and query storage system, a central data storage station having a plurality of stored items of information, a plurality of remote subscriber query stations, signal channels between said remote stations and said central station, an input multiplexer and an output multiplexer at said central station and means including said multiplexers and said signal channels to receive query signals for stored items of information and automatically transmit signals representing the same to the query requesting station, said multiplexers receiving said queries and answering the same in a time division sequence enabling a plurality of subscribers to be served simultaneously with said time divisions being of less duration than the time of a complete query or answer.

9. In a data storage and query system, a main station, a first data storage means at said main station having a plurality of individual units of information stored therein, a plurality of query stations each having an individual query signal generating means, a second data storage means at said main station and having a section thereon individual to each of said query stations, means including said second data storage means for registering query signals from said query stations, a transmitting channel between each of said query stations and said main station, and means operative under the control of said second data storage means for assembling replies in accordance with said queries from the individual units of information stored in said first data storage means and transmitting the same to respective query stations.

10. In a system for simultaneously processing a variety of pulse-type input signals from a plurality of remote stations and for producing response signals corresponding respectively to said input signals, the combination of a central station, individual signal transmission circuits connecting each of said remote stations to said central station, first mutliplexing means at said central station and connected to said signal transmission circuits, said first multiplexing means including means to scan periodically all of the input signals from said remote stations and to produce corresponding sample signals; data processing means at said central station and connected to said first multiplexing means, said data processing means being continuously connected to receive said sample signals and to produce output signals corresponding thereto, a plurality of output circuits each corresponding to one of said remote stations, and second multiplexing means connected to said data processing means to receive said output signals and simultaneously distribute to said output circuits respective signals corresponding to said output signals.

11. A system as claimed in claim 10, wherein said first multiplexing means is operable to scan all of said input signals during a time period less than the time duration of one of the input signal pulses.

12. A system as claimed in claim 11, including magnetic storage means rotating synchronously with the scanning of said input signals, means to record the sample signals on said storage means, and data transfer means for shifting the signals recorded on said storage means to said data processing means after a complete input signal has been assembled in said storage means.

13. A system as claimed in claim 10 including data storage means to store the output signals produced by said data processing means, said data storage means including a plurality of individual storage bins arranged in groups, data transfer means for loading each of said output signals in a respective one of said storage bin groups with the individual elements of the output signal stored in respective bins, said second multiplexing means including means to scan said stored output signals in sequential cycles such that during each cycle one bin of each group is scanned and during the succeeding cycle the next bin of each group is scanned.

14. A system as claimed in claim 13 wherein said data transfer means includes control means for locating said output signals in said storage means with the first signal element thereof positioned in a storage bin immediately to be scanned by said second multiplexing means.

15. A system as claimed in claim 10, wherein said remote stations comprise dial telephones adapted to produce groups of dial pulses selectively representative of a particular inquiry for the current status of certain data, main storage means at said central station for storing the current status of a variety of items selectable for inquiry by said remote stations, said data processing means being operable with said main storage means to produce said output signals in accordance with the current status of selected item.

16. An electrical data storage and query system in which independent and simultaneous reply service is provided to a plurality of remote calling stations each adapted to produce a query message comprising a number of pulses, comprising a central station, signal transmission circuits connecting said remote calling stations to said central station for transmitting said query messages to said central station; first multiplexing means at said central station including means for scanning all of the incoming query messages at a rate faster than the pulse rate of the query message, so that each message pulse is sampled at least once; first storage means at said central station for assembling complete query messages from the signals scanned by said first multiplexing means; data processing means operable with said storage means to produce an output signal corresponding to each assembled query message, second storage means for storing said output signals; second multiplexing means coupled to said second storage means for scanning said output signals, said second multiplexing means including means for distributing reply signals corresponding to the scanned output signals to a plurality of output circuits each corresponding to one of said remote calling stations.

17. A data assembly and transmission system for feeding data selectively and simultaneously to a plurality of remote stations, comprising data processing means for developing multiple-element output messages, data storage means for said output messages and including a series of sections each for a particular one of said remote stations, each of said sections having a series of portions for the individual elements of the output message, multiplexing means for scanning said data storage means in successive cycles such that in one cycle a particular portion of each storage section is scanned and in the next cycle a subsequent portion of each storage is scanned, and distribution means including means to transmit signals corresponding to the scanned signal portions to the respective remote stations.

18. A system as claimed in claim 17, wherein said data storage means comprises a rotating magnetic drum having a plurality of transmission tracks for storing said output messages, said storage sections comprising slots running lengthwise of said drum and said storage portions consisting of the region of intersection between any one slot and any one track, a plurality of transducing heads for said tracks respectively, said multiplexing means including switch means for sequentially connecting said transducing heads to said distribution means.

19. A system as claimed in claim 17, wherein said distribution means comprises shift register means having a plurality of stages each coupled to a respective one of said remote stations, said multiplexing means including means to load said register means during a single scanning cycle with each register stage corresponding to a respective one of the storage portions during that scanning cycle, and means synchronized by said multiplexing means for simultaneously transmitting all of the data stored in said register to the respective remote stations.

20. An electrical data storage and query system in which independent and simultaneous reply service is provided to a plurality of remote calling stations each adapted to produce a query message comprising a number of pulses, said system including a central station with signal transmission circuits connecting said central station to said remote calling stations for transmitting said query messages, first multiplexing means at said central station including means for scanning all of the incoming query messages at a rate at least as fast as the pulse rate of the query messages so that each message pulse is sampled at least once, first storage means at said central station for assembling complete query messages from the signals scanned by said first multiplexing means, data processing means operable with said first storage means to produce output signals corresponding to each assembled query message, second storage means for storing said output signals, and second multiplexing means operative with said second storage means for scanning said output signals, said second multiplexing means including means for transmitting simultaneously a plurality of reply signals corresponding to the scanned output signals.

21. Apparatus for distributing output signals selectively to a plurality of communication lines, each of said output signals comprising a series of elements consisting of at least first and second permuted intelligence pulses, said apparatus comprising: data storage means for said output signals including a plurality of individual storage bins arranged in groups, the number of said groups being at least equal to the number of intelligence pulse elements defining an output signal, data transfer means for loading said output signals in said storage means with all of said first pulses being stored in one group and all of said second pulses being stored in a second group; multiplexing means for scanning said data storage means in sequential cycles; said multiplexing means including means to scan all the bins of one group during one cycle, thereby to sense all of the pulse elements assigned to that group, and similarly to scan the bins of succeeding groups during successive cycles; and distribution means to transmit signals corresponding to the sensed output signals to respective communication lines.

22. Apparatus for distributing multiple-element output signals selectively and simultaneously to a plurality of telegraph lines, said signal elements consisting of a start pulse, a fixed number of permuted intelligence pulses and a stop pulse, comprising rotatable data storage means for the intelligence pulses of said output signals and including a plurality of individual storage bins arranged in groups, data transfer means for loading the intelligence pulses of each of said output signals in said storage means with corresponding elements stored in a respective group, multiplexing means for scanning said data storage means in sequential cycles, all the bins of one group being scanned during one cycle and the bins of succeeding groups being scanned during succeeding cycles, circuit means for inserting a start pulse preceding each series of permuted intelligence pulses and a stop pulse after each series of intelligence pulses, and distribution means to transmit signals corresponding to the scanned output signals to the respective telegraph lines.

23. A system as claimed in claim 12, wherein said storage means comprises a drum including a plurality of tracks, each of said tracks being divided into a plurality of slots assigned respectively to individual remote stations and adapted to store a particular pulse of an input signal, and timing control means for directing the input signal of each remote station to a respective slot of the drum.

24. Apparatus as claimed in claim 9, including data processing means to develop output signals for generating the replies to be transmitted to said query stations, third data storage means to receive and store said output signals, said third storage means having a series of sections each assigned to a corresponding query station to store a complete set of output signals for the respective station, each of said sections comprising a plurality of storage portions for storing separate elements of the output signals for the corresponding query station, said means for assembling replies including means for scanning said third storage means in successive steps such that in one step a particular portion of each storage section is scanned and in the next step a subsequent portion of each storage section is scanned.

25. Apparatus as claimed in claim 24, wherein the means for recording said output signals in said third storage means includes means for positioning the first element of each set of output signals in a storage portion immediately to be scanned during a subsequent step of the read-out of said third storage means.

26. Apparatus as claimed in claim 24, wherein said third storage means comprises cyclically rotatable means having a plurality of separate tracks each containing parts of the output signals for a plurality of said query stations, said scanning means including means to scan all the signals stored in at least one of said tracks during one step of the read-out sequence, and thereafter to scan all the signals stored in at least one other of said tracks during a subsequent step of the read-out sequence.

References Cited in the file of this patent

UNITED STATES PATENTS

| | | |
|---|---|---|
| Re. 24,170 | Lee | June 26, 1956 |
| 1,658,516 | Diane | Feb. 7, 1928 |
| 1,906,646 | Smith | May 2, 1933 |
| 1,931,091 | Smith | Oct. 17, 1933 |
| 2,088,942 | Boswau et al. | Aug. 3, 1937 |
| 2,092,493 | Allen et al. | Sept. 7, 1937 |
| 2,174,031 | Chaskin | Sept. 26, 1939 |
| 2,202,392 | May et al. | May 28, 1940 |
| 2,224,244 | Hicks | Dec. 10, 1940 |
| 2,248,820 | Haselton | July 8, 1941 |
| 2,549,071 | Dusek et al. | Apr. 17, 1951 |
| 2,611,813 | Sharpless et al. | Sept. 23, 1952 |
| 2,622,142 | Jackel | Dec. 16, 1952 |
| 2,658,188 | Malthaner et al. | Nov. 3, 1953 |
| 2,877,446 | Sublette et al. | Mar. 10, 1959 |
| 2,886,643 | Harris | May 12, 1959 |
| 2,910,238 | Miles et al. | Oct. 27, 1959 |